United States Patent [19]
Tatsumi et al.

[11] 3,886,202
[45] May 27, 1975

[54] METHOD FOR DEPOLYMERIZING THERMOPLASTIC RESINS BY LIQUID HEAT TRANSFER MEDIA

[75] Inventors: Takeichi Tatsumi, Tokyo; Hiroshi Yoshihara, Chiba; Gaisuke Uesaka, Mihara, all of Japan

[73] Assignee: Kabushiki Kaisha Denshikagaki, Hiratsuka, Japan

[22] Filed: Feb. 12, 1974

[21] Appl. No.: 441,804

Related U.S. Application Data

[63] Continuation-in-part of Ser. No. 144,867, May 9, 1971, abandoned.

[30] Foreign Application Priority Data

May 19, 1970 Japan.................................. 45-42680

[52] U.S. Cl................................ 260/486 R; 260/2.3
[51] Int. Cl.............................................. C07c 69/54
[58] Field of Search......................... 260/486 R, 2.3

[56] References Cited
UNITED STATES PATENTS

| | | | |
|---|---|---|---|
| 2,030,901 | 2/1936 | Strain.............................. | 260/486 R |
| 2,470,361 | 5/1949 | Miller.............................. | 260/486 R |

*Primary Examiner*—Lorraine A. Weinberger
*Assistant Examiner*—Paul J. Killos

[57] ABSTRACT

Acrylic resin scraps are heat treated by direct contact with a fluid heat transfer medium consisting of a mixture of alkali metal salts in a reaction bath to obtain cracked or decomposition products through depolymerization of the resin. A residue of the decomposed resin can be easily removed from the bath together with the used fluid heat transfer medium.

3 Claims, 1 Drawing Figure

Takeichi Tatsumi,
Hiroshi Yoshihara &
Gaisuke Uesaka

INVENTORS

BY Clario Cecm, agt

METHOD FOR DEPOLYMERIZING THERMOPLASTIC RESINS BY LIQUID HEAT TRANSFER MEDIA

This application is a continuation-in-part of our copending application, Ser. No. 144,867, filed May 9, 1971 now abandoned.

The present invention relates to a method of and apparatus for obtaining decomposition products through the thermal decomposition of thermoplastic resin product wastes and other crushed scrap from plastic materials and, in particular, to a method by which the monomers of resins can be prepared through thermal decomposition of thermoplastic polymeric resins with high efficiency, and wherein other useful chemical products or useful raw materials for chemical products can be prepared through the heat treatment of the resin waste or other scrap from thermoplastic resin products.

BACKGROUND OF THE INVENTION

The consumption of synthetic resins has been steadily increasing recently and, therefore, the wastes and scraps from them are increasing so that the treatments aiming at their recovery are now becoming one of the most important social problems. However, it becomes necessary to develop practical processing methods in accordance with the numerous kinds and properties of the resins.

The thermoplastic resins are also in the same situation as the synthetic resins, and the processing for recovery of thermoplastic resin scrap has been carried out up to now with thermal decomposition methods on a small scale and by indirect thermal processing, that is to say thermal decomposition is promoted by indirectly heating the resin scrap in a bath through external heating. However, the heat efficiency of such methods is low and the decomposition residue accumulates on the inside wall of the vessel, and as a result, the thermal conductivity becomes so low that the heat efficiency in the bath decreases. Therefore, the temperature in the bath must be continuously increased, in order to compensate the loss in heat efficiency. This procedure shortens the life of the bath and has obvious economic disadvantages. Furthermore, it is necessary to remove the decomposition residue after each operation, which is very difficult to do, because of the strong adhesion of the residue on the vessel walls. To add to this disadvantage, the purity of the decomposition products from the synthetic resin is lowered by the high temperature employed in heating the bath. The conventional methods cannot, therefore, be a continuous thermal decomposition process because of the forced intermittent removal of residues.

BRIEF SUMMARY OF THE INVENTION

The present invention is concerned with a method in which a liquid heat transfer medium is applied to heat the thermoplastic synthetic resin scrap or the waste and/or other scrap from thermoplastic synthetic resin products (hereinafter referred to as resin scrap), in which method the heat transfer medium is directly contacted with the thermoplastic resin scrap, to obtain the resin decomposition products, while the decomposition residue is made to float on the liquid heat transfer medium and is easily removed together with recovery or exchanging of the latter.

It is an object of the present invention to provide an improved method for thermally decomposing thermoplastic synthetic resin scrap, particularly acrylic scrap.

It is a further object of the present invention to provide an essentially continuous method for decomposing said scrap.

BRIEF DESCRIPTION OF THE DRAWING

The attached drawing shows a flow diagram of an embodiment of the invention.

DETAILED DESCRIPTION OF THE INVENTION

Figure 1:
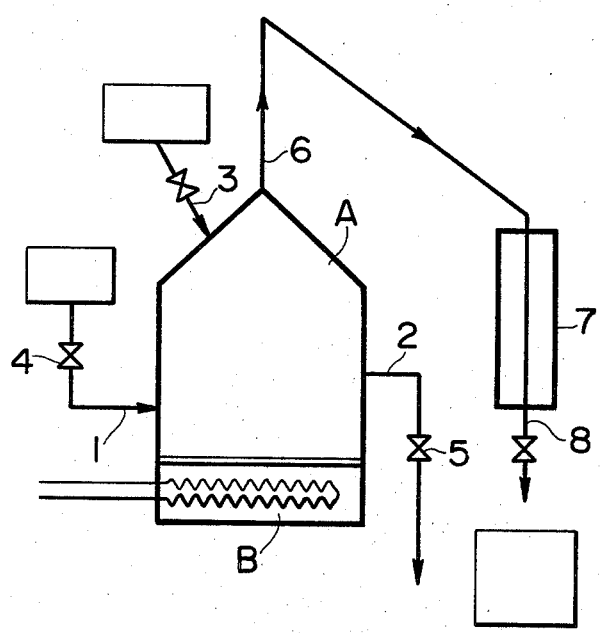

This invention relates to a process for thermally decomposing thermoplastic synthetic resin waste or, more particularly, to a process, wherein an acrylic resin is brought into direct contact with a liquid heat transfer medium consisted of one or more metallic salts, and the decomposition gas is taken out of the sealed heating vessel at its top end for recovery, whereas the decomposition residue is removed together with the used liquid heat transfer medium.

Thermal decomposition of thermoplastic synthetic resin scrap has conventionally been carried out by externally heating a vessel in which the resin scrap is placed. This process, however, is not very economical due to a low heat conductivity involved: the crushed resin scrap cannot be brought into close contact with the inner wall surface of the heated vessel, and the decomposition residue is inevitably deposited on the inner wall surface of the vessel to lower the heat conductivity of the externally heated vessel, reducing the efficiency of the decomposition process. Furthermore, the deposition of the decomposition residue, the removal of which is difficult, shortens the life of the vessel.

The liquid heat transfer medium used in the present invention to overcome the present disadvantages is a liquid material, which can neither dissolve the thermoplastic synthetic resins, nor react with them chemically. It need not be always in the liquid condition at normal temperature, but it should only be in the liquid state at working temperatures. For example, the liquid materials may be metallic elements such as lead, tin, zinc or other metals, or alloys such as soft solder, Wood's metal, Newton's metal and alloys based on Zn, Bi, Pb, Cd, Sb and/or Sn, or metal salts such as potassium nitrate, sodium nitrate, potassium chloride, sodium chloride and mixtures thereof, which are capable of conducting or transferring the heat with ease.

The materials to be used have preferably a melting point of 100°–700°C.

Resin scraps applicable to the present invention are polyolefins such as polyethylene, polypropylene, polyacrylic resin, polystyrene and polyxylene resin.

According to this invention thermoplastic synthetic resin scrap or, preferably acrylic resin scrap is thermally decomposed by bringing it into direct contact with a liquid heat transfer medium preferably consisting of one or more metallic salts for recovering the monomer of the resin. The liquid heat transfer medium may be a single compound or a mixture of compounds selected from chlorides or nitrates of alkali metals such as lithium, potassium and sodium (lithium chloride, sodium chloride, potassium chloride, lithium nitrate, sodium nitrate and potassium nitrate). A mixture of lithium chloride and one or more chlorides of alkali metals other than lithium having melting temperatures below 450°C, is especially preferred. This mixture, which has a specific gravity of 2.0 — 3.0, provides an excellent heat efficiency, because it does not float excessively the resin to be treated but keeps good contact with it. In addition, since the mixture has a melting point of 400°C, the thermal decomposition of the methyl methacrylate resin can be effected at temperatures below 450°C, permitting the recovery of a monomer having an increased purity.

The resins which can be decomposed by the process of this invention are acrylic resins such as methyl polyacrylate, ethyl polyacrylate, propyl polyacrylate, butyl polyacrylate, butyl polymethacrylate, methyl polymethacrylate, propyl polymethacrylate and ethyl polymethacrylate.

Now the invention will be described by way of example with reference to the accompanying drawing. A cylindrical heating vessel A having about 70 cm diameter and about 50 cm height is arranged on top of a heating device B. The vessel A is provided with an inlet port 1 and an outlet port 2 for the heat transfer medium. The inlet port 1 is formed in the lower position of the vessel A and including a valve 4; the outlet port 2 is formed in the vessel A at a higher position than the inlet port 1 and having a valve 5. A hopper 3 for the resin scrap and an outlet port 6 for the decomposition gas are formed in the top end of the vessel A.

The typical operation of the apparatus will be understood from the following description. With the outlet valve 5 closed, the liquid heat transfer medium is introduced into the vessel A through the inlet port 1 until the liquid has a depth of 20 cm. Then the inlet valve 4 is closed and the liquid heat transfer medium is kept at a predetermined decomposition temperature, for example, about 400°C. An acrylic resin which has been crushed so that it had a particle size of about 5mm$^3$, is then introduced from the hopper 3 at a rate of 90kg/hr. The individual particles of the acrylic resin were brought into direct contact at their partial or entire surfaces with the medium and decomposed one by one by the heat transmitted to them. The gaseous product or monomer resulted from the decomposition is allowed to flow out through the outlet port 6 and to pass along a conduit into a condenser, where it is cooled and liquefied.

During decomposition, as the distillation of the decomposition gas proceeds, the proportion of the decomposition residue in the liquid heat transfer medium increases gradually. When the proportion of the decomposition residue reaches a certain value, the introduction of the resin scrap is interrupted and the fresh heat transfer medium is introduced to overflow the used heat transfer medium containing the decomposition residue through the outlet port 2. Thus it is possible to restart the decomposition process. Alternatively, continuous operation of the apparatus may also be possible thanks to said easy removal of the decomposition residue.

The decomposition temperature varies depending on the thermoplastic resin to be processed, but the temperature of 450°C is commonly preferred.

For the better understanding of this invention two Examples will be set forth hereinunder:

EXAMPLE 1

42 weight percent of lithium chloride and 58 weight percent of potassium chloride were mixed and heated to 400° – 450°C for preparing a fused mixture. About 50$l$ of this fused mixture was then put into a decomposition vessel having a capacity of about 250$l$ and kept at temperatures from 400°C to 450°C. To the mixture a crushed methyl methacrylate resin having a mesh size of about 5 – 10mm$^3$ was added continuously at a rate of 1kg/min. When the decomposition gas was condensed and filtered, a monomer was obtained at a rate of 0.92kg/min. The purity of the monomer was 98 percent.

EXAMPLE 2

32.9 weight % of lithium chloride, 32.3 weight percent of potassium chloride and 34.8 weight percent of sodium chloride were introduced into a decomposition tank having a capacity of about 250$l$ and heated to 450°C to prepare a molton mixture, to which milled M.M.A. resin having a grain size of 5–10mm$^3$ was added continuously at a rate of 1 kg/min for thermal decomposition. The gas generated from the decomposition of the methyl methacrylate resin was condensed and filtrated to recover a monomer at a rate of 0.92 kg/min. The purity of the monomer was 98 percent.

What is claimed is:

1. A process for thermally decomposing an acrylic resin, characterized in that the acrylic resin is thermally decomposed by bringing it into direct contact with a liquid heat transfer medium consisting of one or more salts of alkali metals.

2. A method for thermally decomposing a polyacrylic resin comprising directly contacting a liquid heat transfer medium having a melting point of 100°–700° Centigrade with said resin in a closed heated vessel to cause thermal decomposition of said resin, said liquid heat transfer medium consisting of a mixture of alkali metal salts; removing overhead volatile decomposition products of said resin; and separately withdrawing spent medium together with non-volatile decomposition products.

3. The method set forth in claim 2, wherein said alkali metal salts are selected from the group consisting of lithium chloride, lithium nitrate, sodium chloride, sodium nitrate, potassium chloride and potassium nitrate.

* * * * *